(12) United States Patent
Furutani et al.

(10) Patent No.: US 11,560,866 B2
(45) Date of Patent: Jan. 24, 2023

(54) SIDE STRUCTURE OF ENGINE

(71) Applicant: MAZDA MOTOR CORPORATION, Hiroshima (JP)

(72) Inventors: Masayuki Furutani, Hiroshima (JP); Takuya Yamada, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/745,355

(22) Filed: May 16, 2022

(65) Prior Publication Data

US 2022/0381207 A1 Dec. 1, 2022

(30) Foreign Application Priority Data

May 26, 2021 (JP) .............................. JP2021-088653

(51) Int. Cl.
*F02M 35/10* (2006.01)
*F02M 35/104* (2006.01)

(52) U.S. Cl.
CPC .... *F02M 35/104* (2013.01); *F02M 35/10216* (2013.01); *F02M 35/10295* (2013.01); *F02M 35/10321* (2013.01)

(58) Field of Classification Search
CPC ........... F02M 35/104; F02M 35/10216; F02M 35/10295; F02M 35/10321
See application file for complete search history.

(56) References Cited

U.S. PATENT DOCUMENTS

| | | | | |
|---|---|---|---|---|
| 8,365,695 B2* | 2/2013 | Wakamatsu | ......... | F02M 35/104 123/184.21 |
| 2015/0068500 A1* | 3/2015 | Inoue | .................. | F02D 19/0642 123/527 |

FOREIGN PATENT DOCUMENTS

JP 5699635 B2 4/2015

* cited by examiner

*Primary Examiner* — Syed O Hasan
(74) *Attorney, Agent, or Firm* — Studebaker & Brackett PC

(57) ABSTRACT

Removal and breakage of fuel piping during a vehicle front collision is prevented for an engine mounted longitudinally in an engine compartment. Embodiments include a side structure of the engine having an alternator in front of an intake manifold and fuel piping behind the intake manifold so as to extend in the vertical direction. The intake manifold includes a plurality of independent intake pipe portions each having one end portion connected to one side of the engine in a vehicle width direction, and a surge tank portion to which the other end portions of the independent intake pipe portions are connected. As seen from the rear side, a portion of the fuel piping closer to the surge tank portion is located closer to the one side of the engine in the vehicle width direction than the surge tank portion.

20 Claims, 9 Drawing Sheets

SIDE STRUCTURE OF ENGINE

TECHNICAL FIELD

The technology disclosed herein relates to a technical field relating to the structure of an engine.

BACKGROUND

It is conventionally considered that a problem that occurs at the time of a collision of a vehicle is addressed by devising the structure of an intake manifold to be connected to an engine.

For example, Japanese Patent Document JP-A-2012-158994 discloses the front structure of an engine mounted transversely in an engine compartment so that the cylinder bank direction is aligned with the vehicle width direction, in which an intake manifold made of resin is fastened on the vehicle front side of the engine via the upper portion and the lower portion thereof, fuel distribution piping extending in the direction of the crankshaft line is disposed below the upper mount portion of the intake manifold, the intake manifold is separately formed by the side closer to the engine and the side farther from the engine and configured by a plurality of joined split bodies, the base split body closer to the engine is formed to have a strength higher than the base split body farther from the engine, an oil separator cover made of resin is provided on the vehicle front side of the engine, and the base split body and the oil separator cover are provided with retract restriction portions that make contact with each other when the base split body is displaced at the time of a collision.

SUMMARY

When the engine is disposed so that the cylinder bank direction is aligned with the vehicle longitudinal direction, then the intake manifold is disposed on one side in the vehicle width direction of the engine. In this case, the fuel pump and the fuel piping connected to the fuel pump may be disposed behind the engine and vehicle components such as an alternator may be disposed in front of the engine. In such a structure, the vehicle components retract and make contact with the intake manifold at the time of a vehicle front collision. Accordingly, when the intake manifold retracts due to a chain reaction, the intake manifold interferes with the fuel piping, possibly causing the fuel piping to be removed from the fuel pump or to be broken.

Since the engine structure described in JP-A-2012-158994 prevents interference between the intake manifold and the fuel piping on the assumption that the engine is mounted transversely in the engine compartment, the engine structure does not prevent the fuel piping from being removed or broken when the engine is mounted longitudinally in the engine compartment. Accordingly, there is room for improvement in terms of the prevention of the removal and breakage of the fuel piping when the engine is mounted longitudinally in the engine compartment.

The technology disclosed herein addresses the point described above with the goal of preventing the removal and breakage of the fuel piping at the time of a vehicle front collision when the engine is mounted longitudinally in the engine compartment.

To solve the problem described above, the technology disclosed herein is targeted for a side structure of an engine that has an intake manifold connected to a portion of one side of the engine in a vehicle width direction, the engine being mounted longitudinally in an engine compartment so that a cylinder bank direction is aligned with a vehicle longitudinal direction, the side structure of the engine including a vehicle component disposed on a vehicle front side of the intake manifold; and fuel piping through which fuel circulates, the fuel piping being disposed on a vehicle rear side of the intake manifold so as to extend in a vertical direction. The intake manifold includes a plurality of independent intake pipe portions each having one end portion connected to the portion of the one side of the engine in the vehicle width direction, and a surge tank portion to which the other end portion of each of the plurality of independent air intake pipes are connected. As seen from the vehicle rear side, a portion of the fuel piping closer to the surge tank is located closer to the one side of the engine in the vehicle width direction than the surge tank portion.

In this structure, even if a vehicle component retracts at the time of a vehicle front collision and the surge tank portion retracts due to a chain reaction, the surge tank portion retracts so as to avoid the fuel piping. This can prevent interference between the intake manifold and the fuel piping at the time of a vehicle front collision. As a result, the removal and breakage of the fuel piping can be prevented.

In the side structure of an engine according to an embodiment, the surge tank portion is disposed so that a surface portion thereof closer to the engine is substantially flat in the vertical direction.

In this structure, the intake manifold can be compact while the surge tank portion is disposed farther from the engine than the fuel piping. In addition, since the amount of projection of the surge tank portion toward the engine is smaller, the surge tank portion does not easily interfere with the fuel piping when the surge tank portion retracts. This can prevent the removal and breakage of the fuel piping more effectively.

In the embodiment, the intake manifold may further include an intake introduction pipe that extends in the vehicle longitudinal direction, is connected to an upper portion of the surge tank portion, and introduces intake air to the surge tank portion, and, in a cross section taken along a plane that passes through a connection portion between the surge tank portion and the intake introduction pipe and extends in the vertical direction and the vehicle width direction, the surface portion of the surge tank portion closer to the engine may extend downward from a top portion of the intake introduction pipe closer to the engine in a tangent direction of the intake introduction pipe.

In this structure, the intake manifold can be more compact. In addition, interference between the intake introduction pipe and the fuel piping can be prevented appropriately. This can prevent the removal and breakage of the fuel piping more effectively.

In the side structure of an engine, the intake manifold may further include a projecting portion projecting from the surge tank portion downward and toward the engine, and the projecting portion may be fixed to the engine and support the surge tank portion.

In this structure, the distance between the surge tank portion and the fuel piping can be easily kept, so interference between the surge tank portion and the fuel piping can be prevented more effectively. This can prevent the removal and breakage of the fuel piping more effectively.

In the side structure of an engine, portions of the plurality of independent intake pipe portions closer to the engine may be higher in stiffness than portions of the plurality of independent intake pipe portions farther from the engine.

In this structure, if the independent intake pipe is broken by collision loads, this breakage occurs at a position as far away from the engine as possible. This can prevent interference between the intake manifold and the fuel piping more effectively. As a result, the removal and breakage of the fuel piping can be prevented more effectively.

In the side structure of an engine, the intake manifold may be made of resin.

In this structure, since the intake manifold is deformed more easily than the intake manifold made of metal, when a vehicle component makes contact with the intake manifold at the time of a vehicle front collision, the front portion of the intake manifold can absorb collision loads as much as possible. This can reduce the amount of retraction of the intake manifold as little as possible and the interference between the surge tank portion and the fuel piping can be prevented effectively. As a result, the removal and breakage of the fuel piping can be prevented more effectively.

As described above, the technology disclosed herein can prevent the removal and breakage of the fuel piping at the time of a vehicle front collision.

DETAILED DESCRIPTION

An exemplary embodiment will be described in detail below with reference to the drawings. It should be noted that, in the following description, the front, rear, left, right, top, and bottom with respect to a vehicle are simply referred to as the front, rear, left, right, top, and bottom, respectively. In the left-right direction, the left side is the left side as seen from the rear to the front, and the right side is the right side as seen from the rear to the front.

Figure 1:
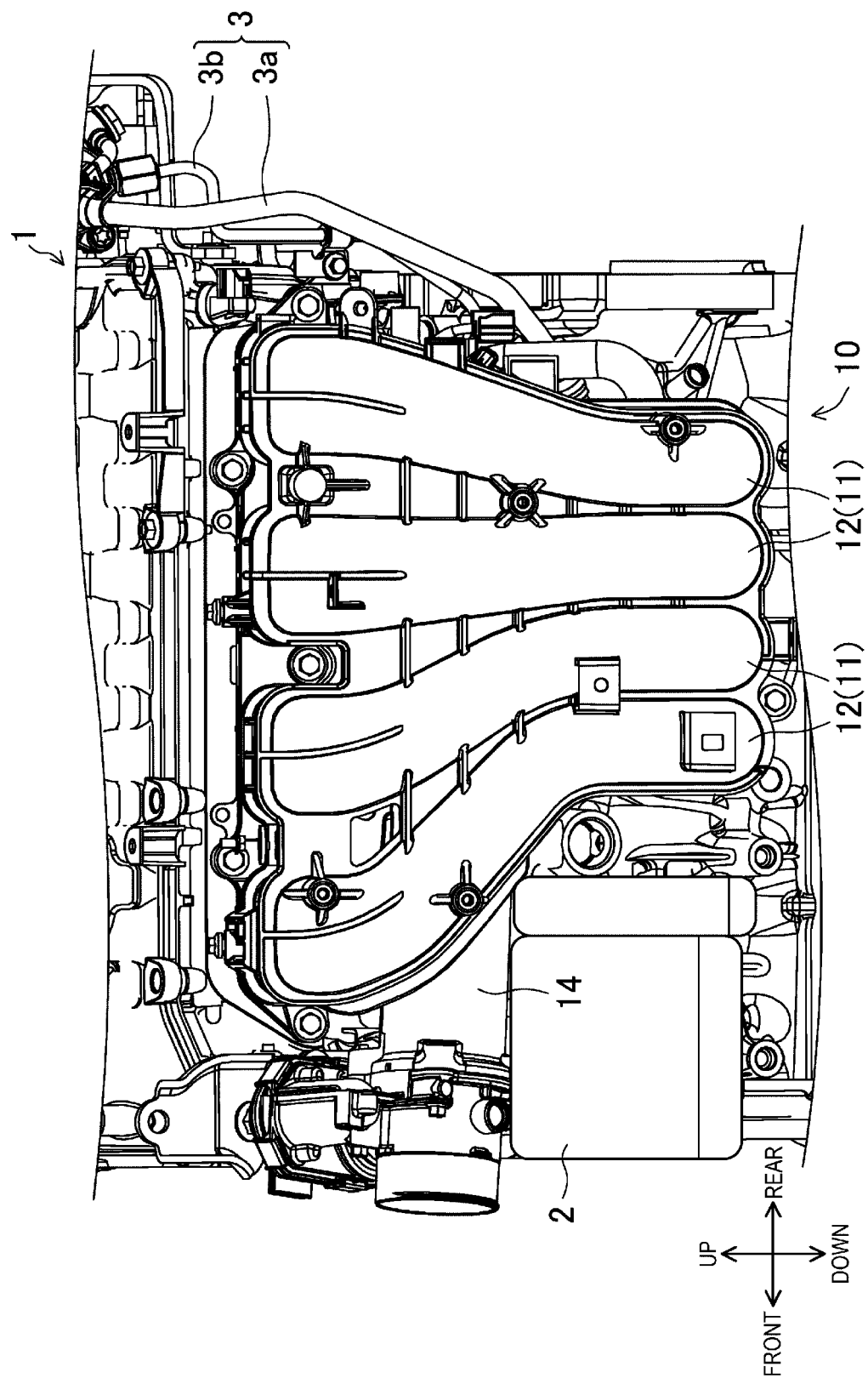
FIG. 1 is a side view of an engine having an intake manifold structure according to an exemplary embodiment.

FIG. 1 is a side view of an engine 1 as seen from the left side. The engine 1 is a multi-cylinder engine and specifically has four cylinders. The engine 1 is mounted vertically in the engine compartment of the vehicle so that the cylinder bank direction is aligned with the longitudinal direction. The engine 1 is disposed so that the left side is the intake side and the right side is the exhaust side.

Figure 2:
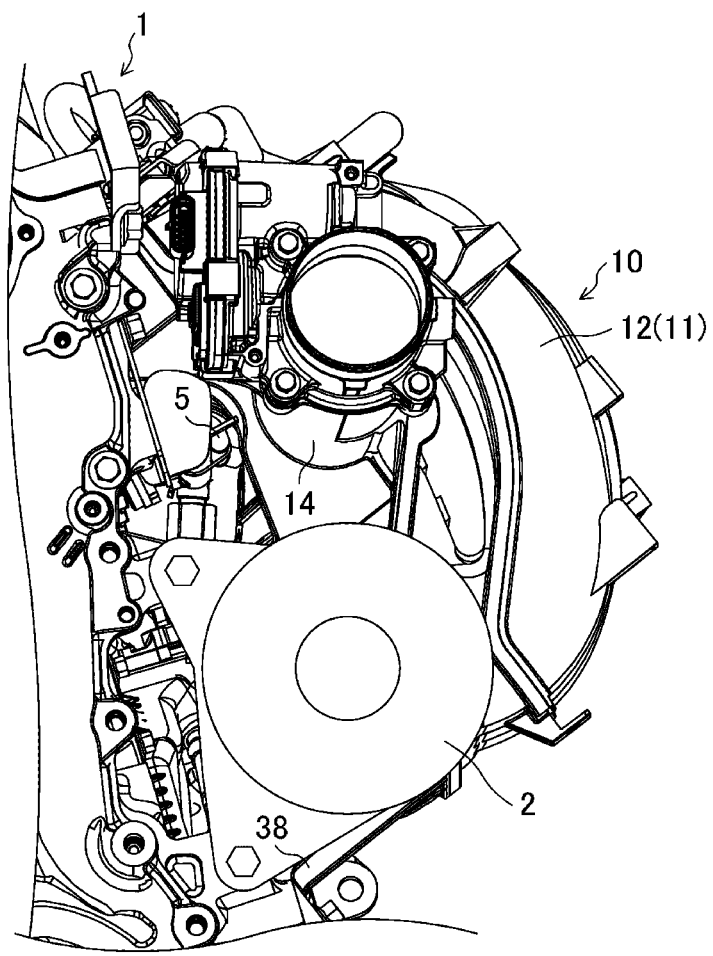
FIG. 2 is an enlarged front view illustrating the intake manifold of the engine.
Figure 3:
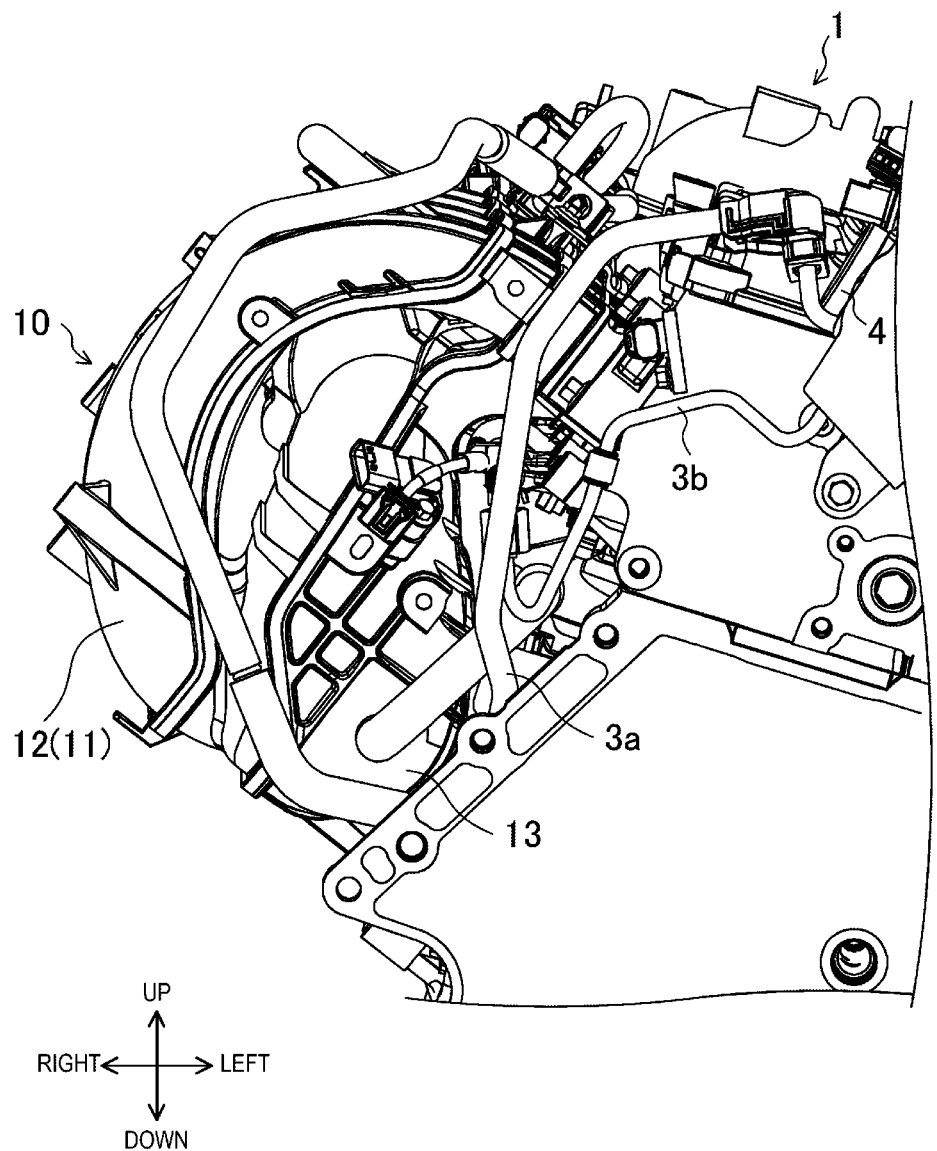
FIG. 3 is an enlarged rear view illustrating the intake manifold of the engine.

An intake manifold 10 through which intake air is introduced into the cylinders is connected to the left side surface of the cylinder head of the engine 1. The intake manifold 10 is made of synthetic resin. As illustrated in FIGS. 2 and 3, the intake manifold 10 includes a plurality of (four in this case) independent intake pipe portions 11, branching to the cylinders, that are arranged in the longitudinal direction, a surge tank portion 13, connected to the lower end portions of the independent intake pipe portions 11, that distributes intake air to the independent intake pipe portions 11, and an intake introduction pipe 14, extending forward from the front portion and upper portion of the surge tank portion 13, that introduces intake air from an intake pipe (not illustrated). The detailed structure of the intake manifold 10 will be described later.

As illustrated in FIG. 1, an alternator 2 as a vehicle component (particularly, an engine auxiliary) is disposed in front of the intake manifold 10. The alternator 2 generates electricity due to the rotation of the engine and acts as a starter for starting the engine. As illustrated in FIGS. 1 and 2, the alternator 2 is disposed at the same height position as the surge tank portion 13 and overlaps with the surge tank portion 13 as seen from the front.

As illustrated in FIGS. 1 and 3, fuel piping 3 through which fuel circulates is disposed behind the intake manifold 10. As illustrated in FIG. 3, the fuel piping 3 includes a low pressure pipe 3a that supplies fuel from a fuel tank (not illustrated) to a fuel pump 4, and a high pressure pipe 3b through which the fuel increased in pressure by the fuel pump 4 circulates. The low pressure pipe 3a is made from a flexible resin tube. The high pressure pipe 3b is made from a metal pipe. Both the low pressure pipe 3a and the high pressure pipe 3b are disposed so as to extend in the vertical direction. The downstream end portion of the high pressure pipe 3b is connected to the rear end portion of a fuel distribution pipe 5. The fuel distribution pipe 5 is a distribution pipe through which the fuel is distributed to the cylinders, and extends in the longitudinal direction along the left side surface of the engine 1. The fuel distribution pipe 5 is disposed between a mount portion 33 described later and the surge tank portion 13, as illustrated in FIG. 3.

Particularly the high pressure pipe 3b of the fuel piping 3 is located on the right side of the surge tank portion 13, that is, on the side closer to a left side surface 1a of the engine 1, as seen from the rear side. The low pressure pipe 3a is also located on the right side of the surge tank portion 13 as seen from the rear side in a no-load state (such as the state in which the vehicle is parked).

The structure of the intake manifold 10 according to the embodiment will be described in detail below with reference to FIGS. 4 to 9.

Figure 4:
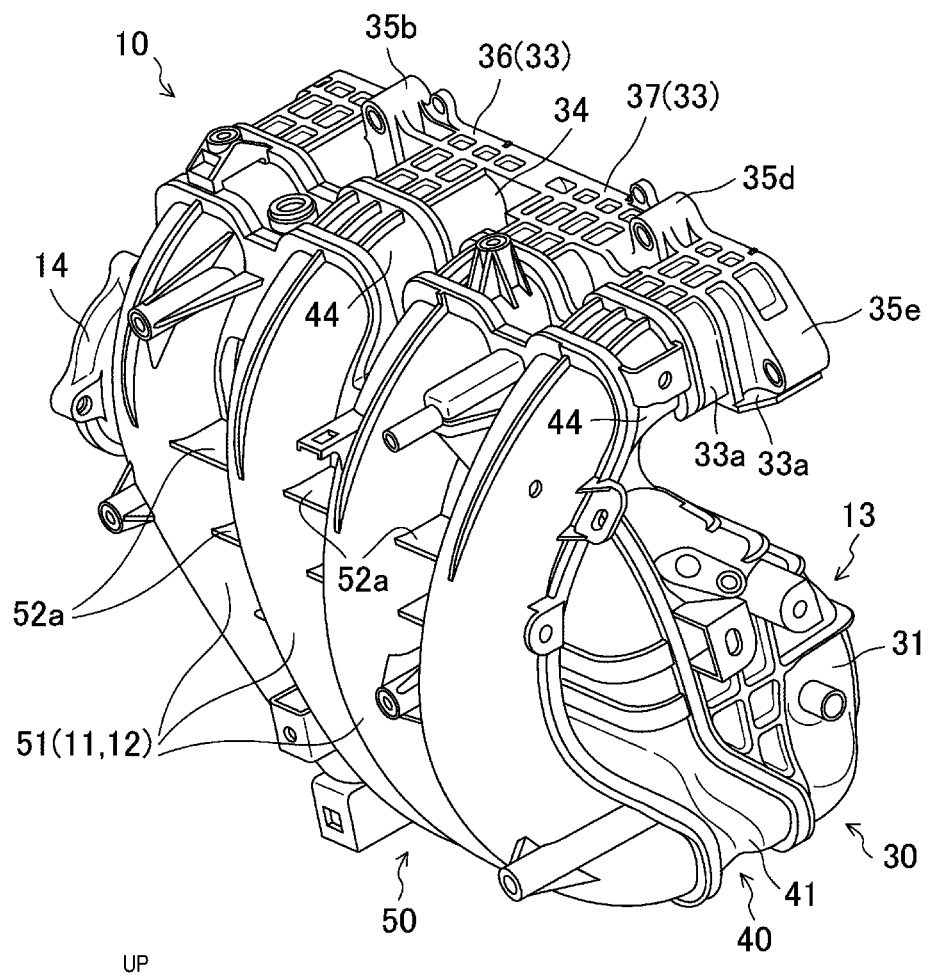
FIG. 4 is a rear perspective view of the intake manifold as seen from the upper left.

As illustrated in FIG. 4, the independent intake pipe portions 11 of the intake manifold 10 are integrally connected to the lower left portion of the surge tank portion 13. The independent intake pipe portions 11 extend so as to curve to the upper right from the connection portions with respect to the surge tank portion 13 and are disposed so as to cover the upper side of the surge tank portion 13. At least a part (particularly the independent intake pipe portion 11 located on the front side) of the plurality of independent intake pipe portions 11 covers the upper side of the intake introduction pipe 14. The lower end portions of the independent intake pipe portions 11 communicate with the inside of the surge tank portion 13. The intake air is stored in the surge tank portion 13 through the intake introduction pipe 14 and then introduced into the cylinders through the independent intake pipe portions 11.

Figure 6:
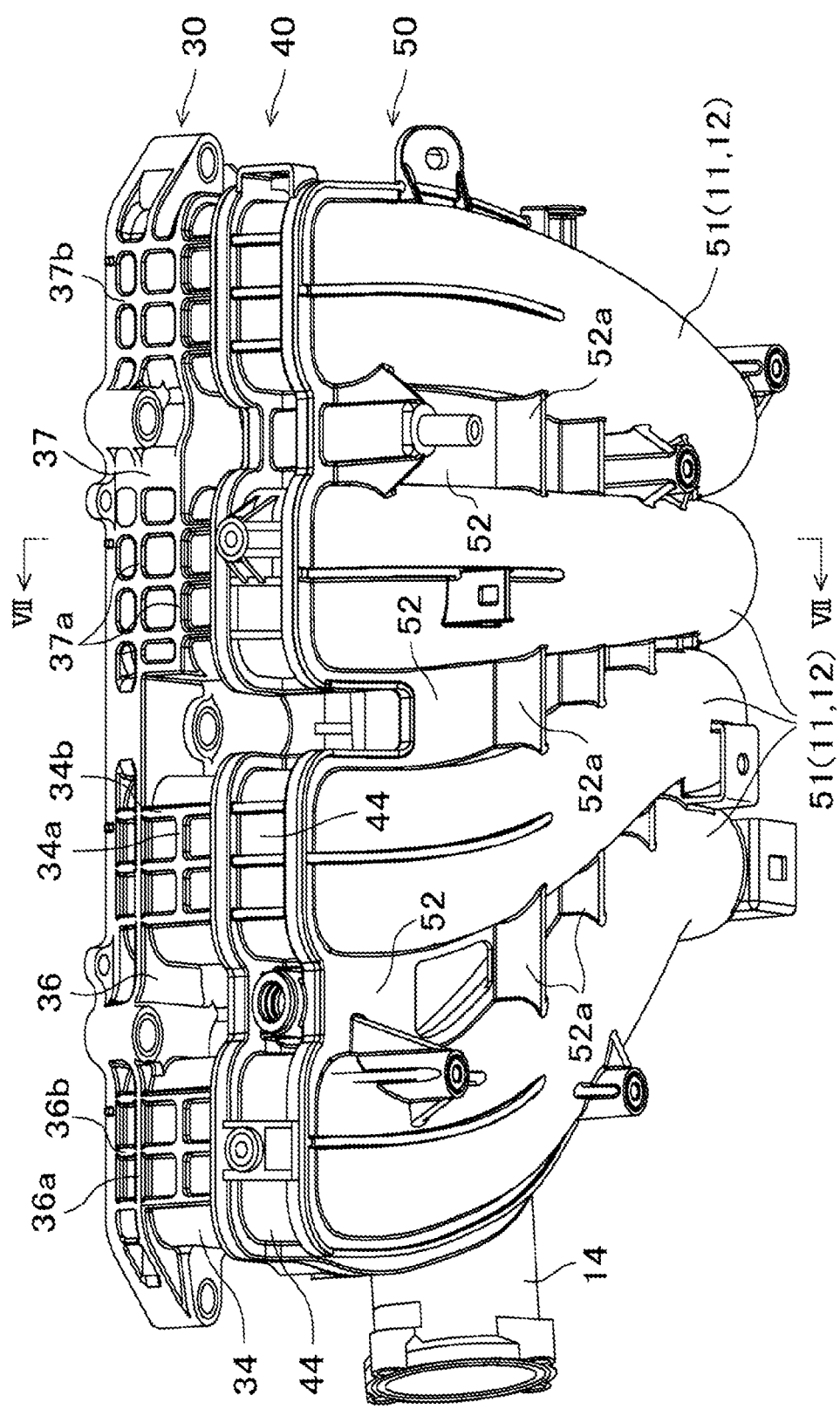
FIG. 6 is a plan view of the intake manifold.

As illustrated in FIG. 6, each of the independent intake pipe portions 11 includes a main passage portion 12, a middle portion 44 (a portion of a second split piece 40 described later), and a downstream side end portion 34 (a portion of a first split piece 30 described later) in order from the intake upstream side. The main passage portion 12, the middle portion 44, and the downstream side end portion 34 are coupled to each other to form each of the independent intake pipe portions 11.

The main passage portions 12 of the independent intake pipe portions 11 are integrated with each other entirely in the longitudinal direction thereof. That is, each pair of main passage portions 12 adjacent to each other is coupled to each other via a coupling portion 52 disposed between the corresponding independent intake pipe portions 11. The coupling portion 52 is provided with a plurality of transverse ribs 52a that extend in the longitudinal direction and the left-right direction to increase the stiffness of the independent intake pipe portions 11.

Each pair of middle portions 44 adjacent to each other is coupled to each other via a coupling portion 44a. Each of the middle portions 44 except the middle portion 44 on the frontmost side has longitudinal ribs 44b (see FIG. 8) extending in the left-right direction.

Each pair of downstream side end portions 34 adjacent to each other is coupled to each other via the coupling portion 34c. Two downstream side end portions 34 on the rear side are shorter than two downstream side end portions 34 on the front side. In the two downstream side end portions 34 on the front side, transverse ribs 34a extending in the longitudinal direction are disposed orthogonally to longitudinal ribs 34b extending in the left-right direction so as to form a knitted pattern. In the two downstream side end portions 34 on the rear side, only the longitudinal ribs 34b are formed and the transverse ribs 34a are not formed.

Figure 5:
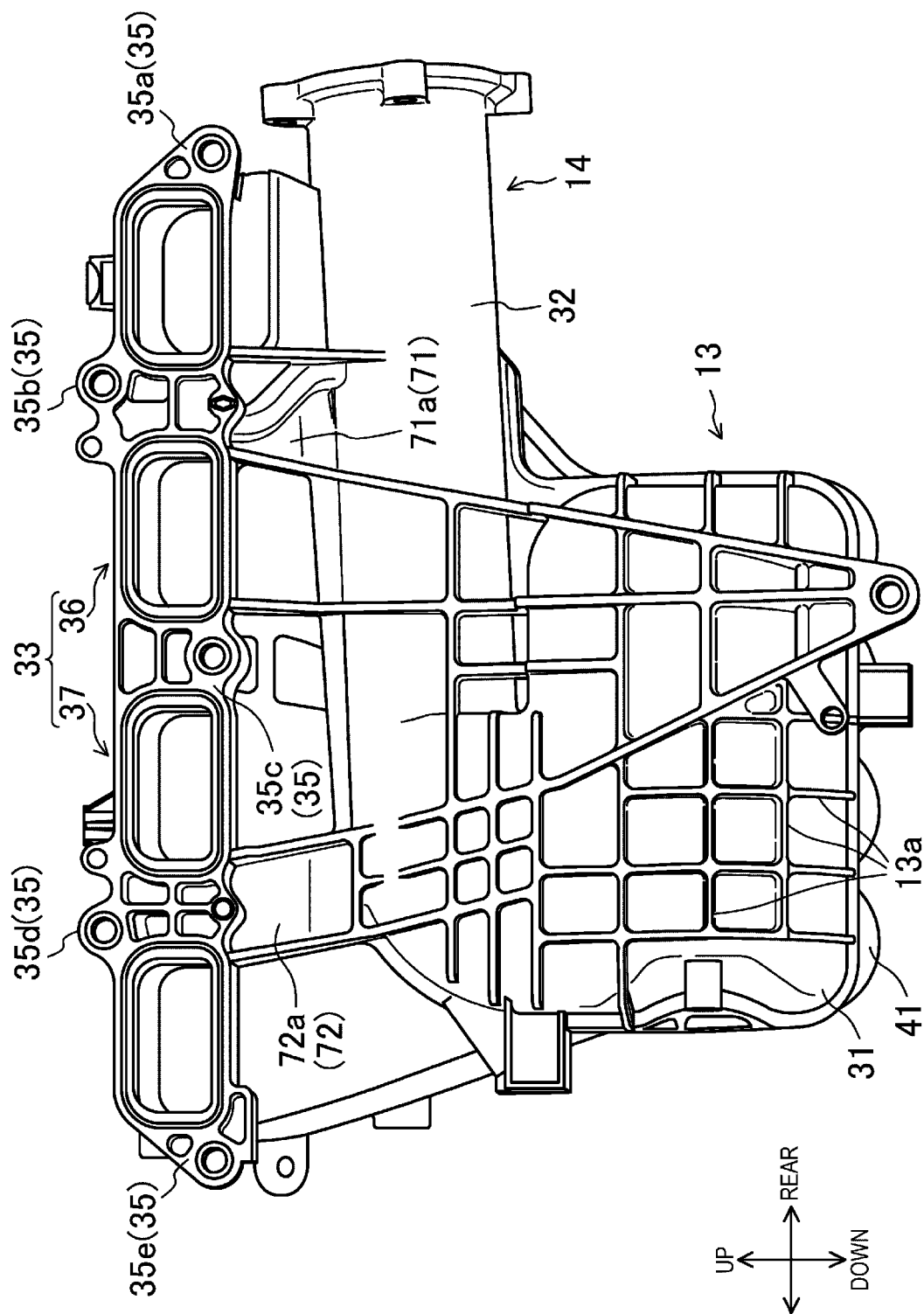
FIG. 5 is a side view of a first split piece of the intake manifold as seen from the right.

As illustrated in FIGS. 5 and 6, the end portions (that is, the portions of the downstream side end portions 34 on the most downstream side) of the independent intake pipe portions 11 opposite to the surge tank portion 13 are integrated with each other to form the mount portion 33 for mounting the intake manifold 10 to the cylinder block of the engine 1. The mount portion 33 is located upward away from the surge tank portion 13.

The mount portion 33 extends in the longitudinal direction so as to integrate the plurality of independent intake pipe portions 11 with each other. The mount portion 33 is formed in a flange shape. The mount portion 33 has a plurality of (five in this case) fastening portions 35 fastened and fixed to the left side surface of the cylinder head of the engine 1 by bolts 62 (see FIG. 1). As illustrated in FIGS. 5 and 6, the fastening portions 35 are disposed in the portion in front of the independent intake pipe portion 11 on the frontmost side, in the portions between the adjacent independent intake pipe portions 11, and in a portion behind the independent intake pipe portion 11 on the rearmost side. The plurality of fastening portions 35 are staggered in the vertical direction with respect to the longitudinal direction. Specifically, when the plurality of fastening portions 35 are assumed to be a first fastening portion 35a, a second fastening portion 35b, a third fastening portion 35c, a fourth fastening portion 35d, and a fifth fastening portion 35e from the front side, the first fastening portion 35a, the third fastening portion 35c, and the fifth fastening portion 35e are disposed on a relatively lower side and the second fastening 35b and the fourth fastening portion 35d are disposed on a relatively upper side.

The mount portion 33 includes a front mount portion 36 disposed on a relatively front side and a rear mount portion 37 disposed on a relatively rear side. The front mount portion 36 is the portion that couples, in the longitudinal direction, the independent intake pipe portions 11 constituting a first intake pipe group 11a and the rear mount portion 37 is the portion that couples, in the longitudinal direction, the independent intake pipe portions 11 constituting a second intake pipe group 11b.

In FIG. 6, the thickness in the left-right direction (that is, the vehicle width direction) of the rear mount portion 37 is thicker than the thickness in the left-right direction of the front mount portion 36. Specifically, the thickness of the rear mount portion 37 is approximately twice as thick as the thickness of the front mount portion 36. Accordingly, the connection portion between the rear mount portion 37 and the downstream side end portion 34 of the independent intake pipe portion 11 is farther from (that is, on the left side of) the engine 1 than the connection between the front mount portion 36 and the downstream side end portion 34 of the independent intake pipe portion 11.

The front mount portion 36 and the rear mount portion 37 have transverse ribs 36a and 37a extending in the longitudinal direction and longitudinal ribs 36b and 37b extending in the left-right direction, respectively. The transverse rib 37a of the rear mount portion 37 is thicker than the transverse rib 36a of the front mount portion 36.

As described above, the stiffness of the portions (particularly, the downstream side end portion 34 and the mount portion 33) of the independent intake pipe portions 11 closer to the engine 1 is higher than the stiffness of the portions (that is, the main passage portion 12 and the middle portion 44) of the independent intake pipe portions 11 farther from the engine 1 because the downstream side end portion 34 and the mount portion 33 are coupled to each other and a plurality of ribs are provided. Accordingly, the portions of the independent intake pipe portions 11 closer to the engine 1 are higher in stiffness than the portions of the independent intake pipe portions 11 farther from the engine 1.

Figure 7:
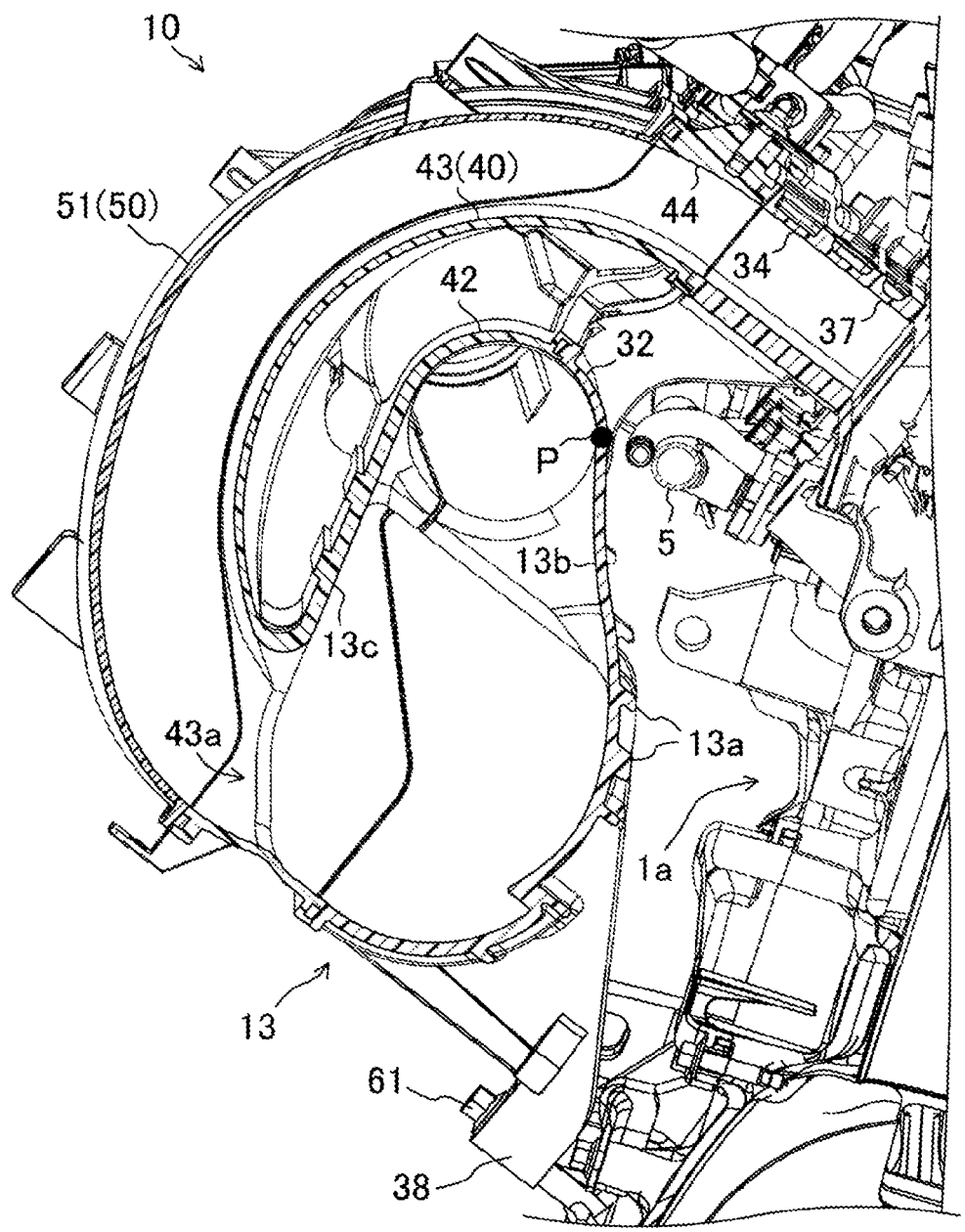
FIG. 7 is a sectional view taken along a plane corresponding to line VII-VII in FIG. 6.

As illustrated in FIG. 5, the surge tank portion 13 is formed so as to be continuous with the rear end portion of the intake introduction pipe 14 and extends in the longitudinal direction and in the left-right direction. As illustrated in FIG. 7, as seen in the longitudinal direction, the surge tank portion 13 has an elliptical shape with the major axis extending in the vertical direction and a minor axis extending in the left-right direction. The right side surface portion 13b of the surge tank portion 13 is disposed so as to be substantially flat in the vertical direction. In the cross section of the surge tank portion 13 taken along a plane that passes through the connection portion between the surge tank portion 13 and the intake introduction pipe 14 and extends in the vertical direction and in the vehicle width direction, the right side surface portion 13b of the surge tank portion 13 extends downward along the tangent direction of the intake introduction pipe 14 from a rightmost top portion P of the intake introduction pipe 14. In addition, in the cross section described above, a left side surface portion 13c of the surge tank portion 13 extends to the lower left along the tangent direction of the intake introduction pipe 14. The surge tank portion 13 has a plurality of reinforcing ribs 13a in the right portion thereof to increase stiffness. It should be noted that "substantially flat" described above may be completely flat, may project slightly in the left-right direction, or may project slightly toward the engine 1 by the amount equivalent to the reinforcing rib 13a.

The intake introduction pipe 14 extends backward while being inclined rightward. The intake introduction pipe 14 does not project to the right side of the surge tank portion 13, that is, does not project toward the engine 1 from the surge tank portion 13. Specifically, in the state in which the intake introduction pipe 14 is mounted to the engine 1, the rightmost top portion P of the intake introduction pipe 14 is disposed at substantially the same position in the left-right direction as the right side surface portion 13*b* of the surge tank portion 13.

As illustrated in FIG. 5, the right portion of the intake manifold 10 is provided with front and rear bridge portions 71 and 72 that couple a surge tank base 31 described later, an introduction pipe base 32 described later, and the mount portion 33 are provided so as to extend in the vertical direction in order to secure the stiffness of the intake manifold 10. The front bridge portion 71 is provided at the same position in the longitudinal direction as the second fastening portion 35*b*. The upper end portion of the front bridge portion 71 is coupled to the lower end portion of the front mount portion 36, the lower end portion of the downstream side end portion 34 on the front side, and the lower end portion of the middle portion 44 on the front side. The lower end portion of the front bridge portion 71 is coupled to the upper right portion of the intake introduction pipe 14. The upper end portion of the front bridge portion 71 is formed so as to couple the two independent intake pipe portions 11 on the front side in the longitudinal direction. The rear bridge portion 72 is disposed at the same position in the longitudinal direction as the fourth fastening portion 35*d*. The upper end portion of the rear bridge portion 72 is coupled to the lower end portion of the rear mount portion 37, the lower end portion of the downstream side end portion 34 on the rear side, and the lower end portion of the middle portion 44 on the rear side. The lower end portion of the rear bridge portion 72 is coupled to the upper rear portion of the right side surface portion 13*b* of the surge tank portion 13. The upper end portion of the rear bridge portion 72 is formed so as to couple the two independent intake pipe portions 11 on the rear side in the longitudinal direction.

The front bridge portion 71 extends from the upper end portion toward the lower end portion while being inclined leftward. In addition, although not illustrated, the rear bridge portion 72 extends from the upper end portion toward the lower end portion while being inclined leftward. The front bridge portion 71 and the rear bridge portion 72 support the upper portion of the surge tank portion 13 so that the surge tank portion 13 does not approach the engine 1 (so that the surge tank portion 13 does not move to the right side).

Figure 8:
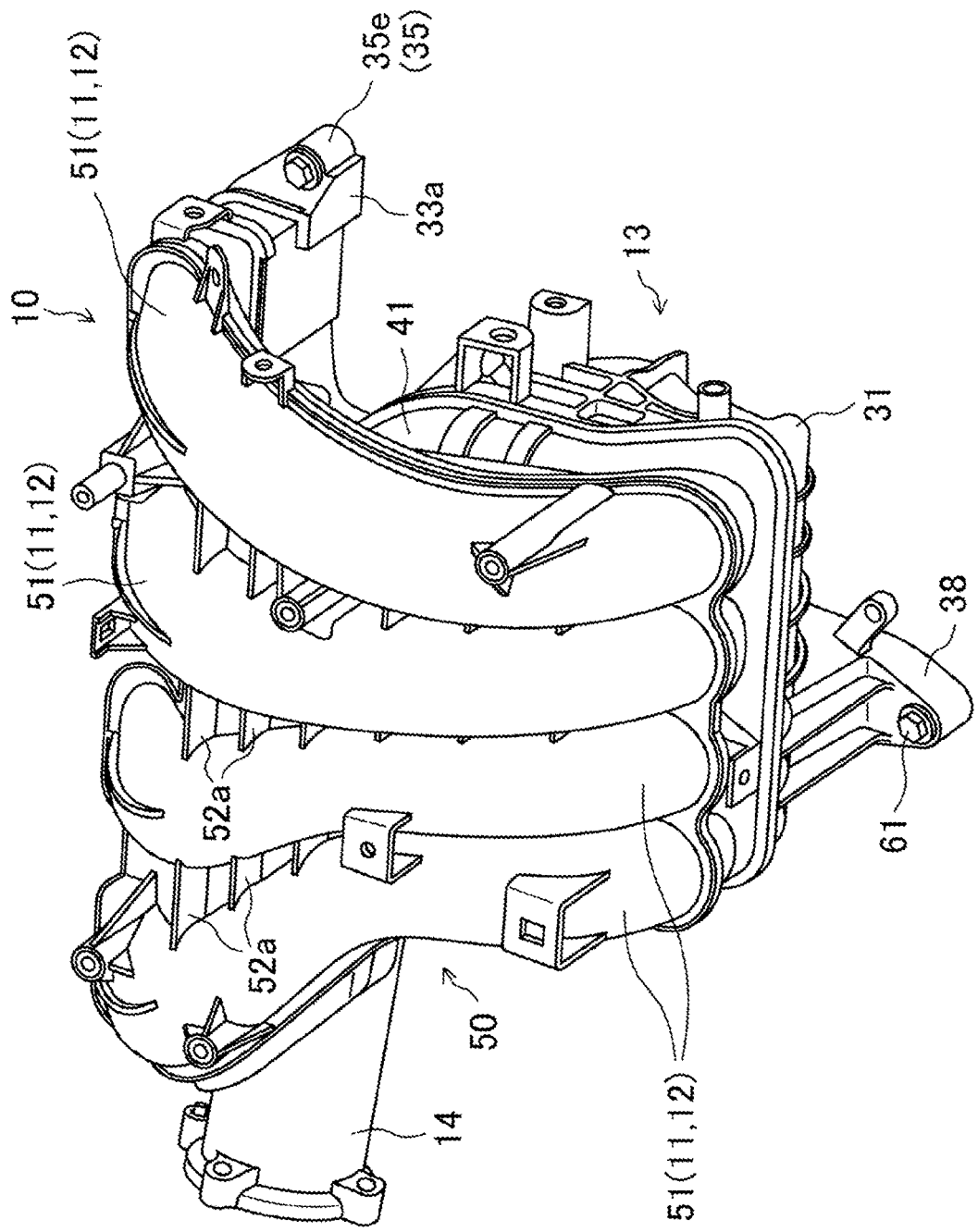
FIG. 8 is a rear perspective view of the intake manifold as seen from the lower left.

A projecting portion 38 projecting downward is formed below the surge tank portion 13. As illustrated in FIG. 8, the projecting portion 38 is formed so as to project toward the right side (that is, toward the engine) as well as the lower side. The lower end portion of this projecting portion 38 is fastened and fixed to the left side surface of the cylinder block of the engine 1 via the bolts 61. The projecting portion 38 supports the lower portion of the surge tank portion 13 so that the surge tank portion 13 does not approach the engine 1 (so that the surge tank portion 13 does not move to the right side).

In the embodiment, the intake manifold 10 includes three split pieces divided in the left-right direction (vehicle width direction). Specifically, the intake manifold 10 includes the first split piece 30 located on the side closest (on the right side) to the engine 1, the third split piece 50 located on the side farthest (on the left side) from the engine 1, and the second split piece 40 located between the first split piece 30 and the third split piece 50. The first to third split pieces 30, 40, and 50 are integrally molded of resin individually by different molds, and then joined and integrated together by vibration welding after being molded. This prevents gaps from being formed between the first to third split pieces 30, 40, and 50.

Figure 9:
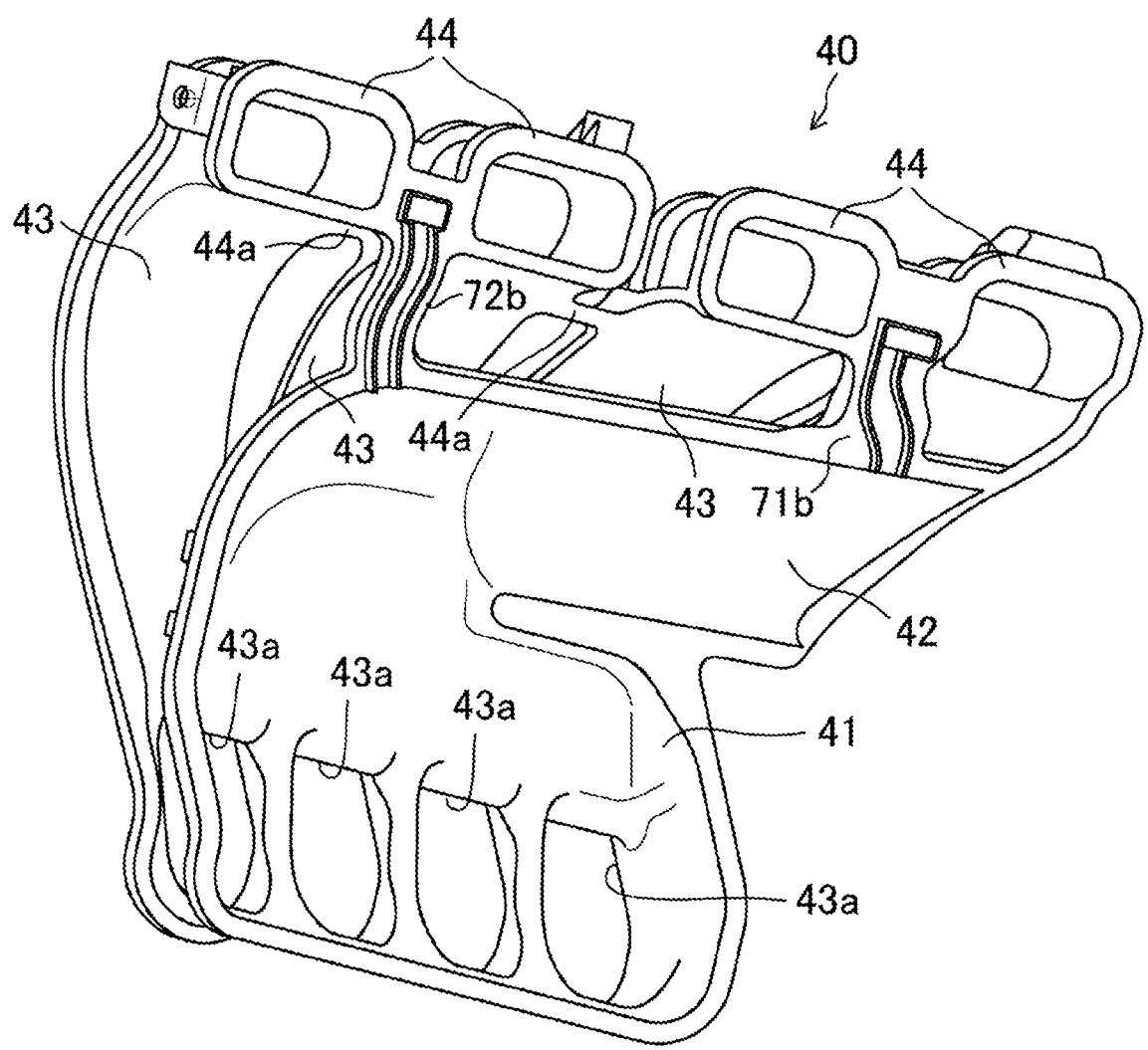
FIG. 9 is a perspective view of a second split piece of the intake manifold.

The first split piece 30 constitutes the right side portion (referred to below as the surge tank base 31) of the surge tank portion 13, all of the front portion and the right portion of the rear portion of the intake introduction pipe 14 (referred to below as the introduction pipe base 32), the mount portion 33, a right side portion 71*a* of the front bridge portion 71, a right side portion 72*a* of the rear bridge portion 72, the downstream side end portions 34 of the independent intake pipe portions 11, and the projecting portion 38. As illustrated in FIG. 9, the second split piece 40 constitutes a left side portion (referred to below as a surge tank portion other portion 41) of the serge tank portion 13, a left side portion (referred to below as an independent pipe other portion 42) of the rear portion of the intake introduction pipe 14, right side portions (referred to below as independent pipe bases 43) of the main passage portions 12 of the independent intake pipe portions 11, a middle portion 44 between the main passage portion 12 of the independent intake pipe portion 11 and the downstream side end portion 34, a left side portion 71*b* of the front bridge portion 71, and a left side portion 72*b* of the rear bridge portion 72. The third split piece 50 constitutes left side portions (referred to below as independent pipe other portions 51) of the main passage portions 12 of the independent intake pipe portions 11.

The intake introduction pipe 14 is formed by combining the first split piece 30 with the second split piece 40 in the intake introduction pipe 14. The surge tank portion 13 is formed by combining the half of the introduction pipe base 32 of the first split piece 30 with the half of the introduction pipe other portion 42 of the second split piece 40.

The main passage portions 12 of the independent intake pipe portions 11 are formed by combining the second split piece 40 with the third split piece 50 in the main passage portions 12. That is, the main passage portion 12 is formed by combining the half of the independent pipe base 43 of the second split piece 40 and the half of the independent pipe other portion 51 of the third split piece 50 with each other. As illustrated in FIG. 9, a plurality of (four in this case) communication holes 43*a* that communicate with the inside of the surge tank portion 13 are formed in the independent pipe base 43 so as to correspond to the independent intake pipe portions 11. Intake air is introduced from the surge tank portion 13 to the independent intake pipe portions 11 through these communication holes 43*a*.

The independent intake pipe portions 11 are formed entirely in the longitudinal direction thereof by the coupling the first to third split pieces 30, 40, and 50 to each other. The portions of the independent intake pipe portion 11 downstream of the main passage portions 12 are formed by coupling the downstream side end portions 34 of the first split piece 30 with the middle portions 44 of the second split piece 40 in the left-right direction.

The front bridge portion 71 is formed by combining the first split piece 30 with the second split piece 40 in the front bridge portion 71. That is, the front bridge portion 71 is formed by combining the right side portion 71*a* of the first split piece 30 with the left side portion 71*b* of the second split piece 40.

The rear bridge portion 72 is formed by combining the first split piece 30 with the second split piece 40 in the rear bridge portion 72. That is, the rear bridge portion 72 is formed by combining the right side portion 72*a* of the first split piece 30 with the left side portion 72*b* of the second split piece 40.

When the alternator 2 is disposed in front of the intake manifold 10 as in embodiment 1, the alternator 2 retracts and makes contact with the intake manifold 10 at the time of a vehicle front collision. Accordingly, when the intake manifold 10 retracts due to a chain reaction, the intake manifold 10 may interfere with the fuel piping 3. When the intake manifold 10 interferes with the fuel piping 3, the fuel piping 3 may be removed from the fuel pump 4 or may be broken. In particular, when the high pressure pipe 3b is broken, a large amount of fuel leaks.

In contrast, in the embodiment, the portion of the fuel piping 3 close to the surge tank portion 13 is located on the right side of the surge tank portion 13 as seen from the rear. Since the alternator 2 is disposed at the same height position as the surge tank portion 13, the alternator 2 makes contact with the surge tank portion 13 at the time of a vehicle front collision. Accordingly, the surge tank portion 13 retracts when the intake manifold 10 is deformed by collision loads, but the surge tank portion 13 does not overlap with the fuel piping 3 in the longitudinal direction, thereby preventing the interference between the surge tank portion 13 and the fuel piping 3. This can prevent the removal and breakage of the fuel piping 3.

In addition, in the embodiment, the right side surface portion 13b of the surge tank portion 13 is substantially flat in the vertical direction. Accordingly, the surge tank portion 13 can be disposed farther from the engine 1 than the fuel piping 3 and the intake manifold 10 can be compact. In addition, since the amount of projection of the surge tank portion 13 toward the engine 1 is smaller, the surge tank portion 13 does not easily interfere with the fuel piping 3 when the surge tank portion 13 retracts. This can prevent the removal and breakage of the fuel piping 3 more effectively.

In addition, in the embodiment, the intake manifold 10 includes the intake introduction pipe 14 that extends in the longitudinal direction, is connected to the upper portion of the surge tank portion 13, and introduces intake air to the surge tank portion 13, and, in the cross section taken along a plane that passes through the connection portion between the surge tank portion 13 and the intake introduction pipe 14 and extends in the vertical direction and in the vehicle width direction, the right side surface portion 13b of the surge tank portion 13 extends downward along the tangent direction of the intake introduction pipe 14 from the top portion P on the left side of the intake introduction pipe 14. This can make the intake manifold 10 more compact. In addition, the intake introduction pipe 14 does not project to the right side of the surge tank portion 13, thereby appropriately preventing the interference between the intake introduction pipe 14 and the fuel piping 3. As a result, the removal and breakage of the fuel piping 3 can be prevented more effectively.

In addition, in the embodiment, the intake manifold 10 has the projecting portion 38 projecting downward and toward the engine 1 from the surge tank portion 13 and the projecting portion 38 is fixed to the engine 1 and supports the surge tank portion 13. This can easily maintain the distance between the surge tank portion 13 and the fuel piping 3, thereby preventing the interference between the surge tank portion 13 and the fuel piping 3 more effectively. As a result, the removal and breakage of the fuel piping 3 can be prevented more effectively.

In addition, in the embodiment, in the state in which the intake manifold 10 is mounted to the engine 1, the surge tank portion 13 is supported by the front bridge portion 71 and the rear bridge portion 72, which extend from the surge tank portion 13 toward the right side while being inclined upward. This can keep the state in which the surge tank portion 13 is as far away from the engine 1 as possible, thereby keeping the surge tank portion 13 away toward the left side of the fuel piping 3. Since the distance between the surge tank portion 13 and the fuel piping 3 can be easily kept as a result, the interference between the surge tank portion 13 and the fuel piping 3 can be prevented more effectively. Accordingly, the removal and breakage of the fuel piping 3 can be prevented more effectively.

In addition, in the embodiment, the portions (the downstream side end portions 34 and the mount portions 33) of the plurality of independent intake pipe portions 11 closer to the engine 1 are higher in stiffness than the portions (the main passage portions 12 and the middle portions 44) of the plurality of independent intake pipe portions 11 farther from the engine 1. Accordingly, when the independent intake pipe portions 11 are broken by collision loads, this breakage occurs at a position as far away from the engine 1 as possible. This can prevent interference between the intake manifold 10 and the fuel piping 3 more effectively. As a result, the removal and breakage of the fuel piping 3 can be prevented more effectively.

Other Embodiments

The technology disclosed herein is not limited to the embodiment described above and other embodiments are allowed without departing from the spirit of the claims.

For example, the intake manifold structure is applied to a four-cylinder engine in the embodiment described above. The intake manifold structure is not limited to this example and may be applied to an engine with three or less cylinders and may also be applied to an engine with five or more cylinders.

In addition, in the embodiment described above, an alternator is used as an example of the vehicle component. The vehicle component is not limited to this example and may be, for example, a motor or a battery.

The embodiments described above are only examples and the scope of the present disclosure should not be interpreted as limiting. The scope of the present disclosure is defined by the claims and all modifications and changes falling within the equal scope of the claims are within the scope of the present disclosure.

The technology disclosed herein is useful as the intake manifold structure having an intake manifold connected to a portion of one side in the vehicle width direction of a multi-cylinder engine mounted longitudinally in the engine compartment so that the cylinder bank direction is aligned with the vehicle longitudinal direction.

What is claimed is:

1. A side structure of an engine that has an intake manifold connected to a portion of one side of the engine in a vehicle width direction, the engine being mounted longitudinally in an engine compartment so that a cylinder bank direction is aligned with a vehicle longitudinal direction, the side structure of the engine comprising:
   a vehicle component disposed on a vehicle front side of the intake manifold; and
   fuel piping through which fuel circulates, the fuel piping being disposed on a vehicle rear side of the intake manifold so as to extend in a vertical direction,
   wherein the intake manifold includes a plurality of independent intake pipe portions each having one end portion connected to the portion of the one side of the engine in the vehicle width direction, and
   a surge tank portion to which the other end portion of each of the plurality of independent air intake pipe portions are connected, and
   wherein, as seen from the vehicle rear side, a portion of the fuel piping closer to the surge tank portion is located closer to the one side of the engine in the vehicle width direction than the surge tank portion.

2. The side structure of an engine according to claim 1, wherein the surge tank portion is disposed so that a surface portion thereof closer to the engine is substantially flat in the vertical direction.

3. The side structure of an engine according to claim 2, wherein the intake manifold further includes an intake introduction pipe that extends in the vehicle longitudinal direction, is connected to an upper portion of the surge tank portion, and introduces intake air to the surge tank portion, and wherein, in a cross section taken along a plane that passes through a connection portion between the surge tank portion and the intake introduction pipe and extends in the vertical direction and the vehicle width direction, the surface portion of the surge tank portion closer to the engine extends downward from a top portion of the intake introduction pipe closer to the engine in a tangent direction of the intake introduction pipe.

4. The side structure of an engine according to claim 3, wherein the intake manifold further includes a projecting portion projecting from the surge tank portion downward and toward the engine, and the projecting portion is fixed to the engine and supports the surge tank portion.

5. The side structure of an engine according to claim 4, wherein portions of the plurality of independent intake pipe portions closer to the engine are higher in stiffness than portions of the plurality of independent intake pipe portions farther from the engine.

6. The side structure of an engine according to claim 5, wherein the intake manifold is made of resin.

7. The side structure of an engine according to claim 1, wherein the intake manifold further includes a projecting portion projecting from the surge tank portion downward and toward the engine, and the projecting portion is fixed to the engine and supports the surge tank portion.

8. The side structure of an engine according to claim 1, wherein portions of the plurality of independent intake pipe portions closer to the engine are higher in stiffness than portions of the plurality of independent intake pipe portions farther from the engine.

9. The side structure of an engine according to claim 1, wherein the intake manifold is made of resin.

10. The side structure of an engine according to claim 2, wherein the intake manifold further includes a projecting portion projecting from the surge tank portion downward and toward the engine, and the projecting portion is fixed to the engine and supports the surge tank portion.

11. The side structure of an engine according to claim 2, wherein portions of the plurality of independent intake pipe portions closer to the engine are higher in stiffness than portions of the plurality of independent intake pipe portions farther from the engine.

12. The side structure of an engine according to claim 2, wherein the intake manifold is made of resin.

13. The side structure of an engine according to claim 3, wherein the intake manifold is made of resin.

14. The side structure of an engine according to claim 7, wherein portions of the plurality of independent intake pipe portions closer to the engine are higher in stiffness than portions of the plurality of independent intake pipe portions farther from the engine.

15. The side structure of an engine according to claim 7, wherein the intake manifold is made of resin.

16. The side structure of an engine according to claim 8, wherein the intake manifold is made of resin.

17. The side structure of an engine according to claim 10, wherein portions of the plurality of independent intake pipe portions closer to the engine are higher in stiffness than portions of the plurality of independent intake pipe portions farther from the engine.

18. The side structure of an engine according to claim 10, wherein the intake manifold is made of resin.

19. The side structure of an engine according to claim 11, wherein the intake manifold is made of resin.

20. The side structure of an engine according to claim 14, wherein the intake manifold is made of resin.

* * * * *